United States Patent [19]

Hashimoto et al.

[11] 4,320,634
[45] Mar. 23, 1982

[54] THERMAL-FUSIBLE TAPE OF A WARP KNITTED FABRIC

[75] Inventors: Koichi Hashimoto, Ibaraki; Takamasa Nishimura, Shiga, both of Japan

[73] Assignee: Toray Industries, Incorporated, Tokyo, Japan

[21] Appl. No.: 170,677

[22] PCT Filed: Mar. 23, 1979

[86] PCT No.: PCT/JP79/00072

§ 371 Date: Nov. 24, 1979

§ 102(e) Date: Nov. 20, 1979

[87] PCT Pub. No.: WO79/00832

PCT Pub. Date: Oct. 18, 1979

[30] Foreign Application Priority Data

Mar. 24, 1978 [JP] Japan ............................ 53-32984
Mar. 24, 1978 [JP] Japan ............................ 53-32985

[51] Int. Cl.³ .................... D04B 7/16; D04B 1/14
[52] U.S. Cl. ............................. 66/202; 66/192; 66/194; 2/232
[58] Field of Search ............ 66/202, 190–195; 139/420, 383, 430; 428/193, 253; 2/232, 269; 24/205, 16 C

[56] References Cited

U.S. PATENT DOCUMENTS

| | | | |
|---|---|---|---|
| 2,360,953 | 10/1944 | Lippmann | 2/232 |
| 2,757,435 | 8/1956 | Bihaly | 139/420 |
| 2,840,117 | 6/1958 | Scruggs | 139/383 |
| 2,854,352 | 9/1958 | Gronemeyer | 428/193 |
| 2,903,775 | 9/1959 | Johns | 24/205.16 |
| 3,168,749 | 2/1965 | Cala | 2/232 X |
| 3,457,739 | 7/1969 | Frand et al. | 66/187 |
| 3,766,566 | 10/1973 | Tadokoro | 2/232 |
| 4,015,449 | 4/1977 | Matsuda | 60/195 |
| 4,041,577 | 8/1977 | Matsuda | 24/205.16 C |

*Primary Examiner*—Ronald Feldbaum
*Attorney, Agent, or Firm*—Miller & Prestia

[57] ABSTRACT

This invention relates to a thermal-fusible tape used to adhere two fabrics together, and used especially to hem slacks.

The adhesive tape of the present invention consists of a warp knitted tape, and at least one thermal adhesive thread which longitudinally extends the width of several wales of the warp knitted fabric in each edge portion of said tape and said thread is positioned on one or both surfaces of said warp knitted fabric.

13 Claims, 9 Drawing Figures

THERMAL-FUSIBLE TAPE OF A WARP KNITTED FABRIC

DESCRIPTION

TECHNICAL FIELD

This invention relates to a thermo-fusible tape used to adhere two pieces of fabric together or to hem slacks.

BACKGROUND ART

A common practice in hemming slacks is to sew the bottom edge of the garment to the leg of the garment by using a sewing machine or by hand stitching after turning the bottom edge of the garment into the leg thereof so that the folded part is situated inside of the leg. However, there are some drawbacks in these methods. For instance, when hemming is carried out, it must be done by a person skilled in this technique, or sometimes the appearance of the leg is degraded due to the fact that the stitched thread is positioned on the outside surface of the hemmed leg of the slacks. Furthermore, there is the possibility that the thread used for hemming can break. If the thread breaks while the slacks are being worn, the fold of fabric which forms the hem will extend downwardly from the bottom edge of the leg of the slacks and will result in the folded portion separating from the leg of the garment. When this condition occurs, a person wearing such slacks feels uncomfortable. Recently, there have been developed some methods to hem garments by using a thermo-fusible tape instead of using a sewing thread. One example of these methods is using a fabric tape coated with a bonding agent which is applied to the entire surface of the tape. However, this type of tape does not have softness because the entire surface of the tape is coated with a binding agent. Further, when using this tape, there is a drawback in that the portion of the leg to which the tape is applied puckers. This puckering cannot be avoided because the fabric tape coated with the binding agent over its entire surface is stiff and has little flexibility and elasticity. Because of this the fabric tape is difficult to use for hemming slacks, and therefore, the use of this fabric tape is limited.

One kind of binding tape made from a woven cloth which uses a thermoplastic yarn as one component of the fabric is disclosed in the specification of Japanese Laid Open No. sho 50-20488 (U.S. Pat. No. 3,766,566). Because this type of cloth tape has little flexibility, the center portion of this tape must consist of weft yarns only in order to give it the proper flexibility. Thus, the tape has some slackness, and the puckering of the fabric mentioned above can be prevented.

DISCLOSURE OF INVENTION

This invention relates to a concept to adhere two pieces of fabric together by means of a fabric tape, and an object of the present invention is to provide a strong thermo-fusible tape which is suitable for hemming slacks, can be easily handled and has the proper elasticity so as to gently conform to the fabric and prevent puckering.

Furthermore, an object of the present invention is to provide a thermo-fusible tape having a stable construction so that when the tape is cut along the perpendicular direction with respect to the lengthwise direction of the tape, there are no loose threads, no loose loops, and no longitudinal splits extending from the cut edge.

Other objects and advantages of the present invention will become clear from the following descriptions.

An adhesive tape of the present invention is made of a warp knitted fabric and is characterized in that at least one thermal adhesive thread extends longitudinally within a width of several wales of the warp knitted fabric, wherein thermal adhesive threads are positioned on both surfaces or one surface of the fabric.

According to the present invention, the warp knitted fabric has a net construction.

Also, according to the present invention, a plurality of thermal adhesive threads are laid-in the tape in the longitudinal direction and in an almost straight direction, or at least one thermal adhesive thread is laid into the warp knitted fabric over at least two wales.

Furthermore, according to the present invention, a thermo-fusible tape consists of a warp knitted fabric, and the warp knitted fabric comprises threads forming chains of loops, inlay threads extending within a width of one or several wales, and other threads which form one or more loops together with the loops of the chain in a wale, successively forms one or more loops with loops of another chain in another wale located away from said wale at a distance of one or several wales, and again forms loops in the first wale in the same way, said loop formations being repeated; and said warp knitted fabric further comprises at least one thermal adhesive thread which extends longitudinally within a width of several wales of the warp knitted fabric in each edge portion of the tape, so that the thermal adhesive thread appears on one or both surfaces of the fabric.

The thermal adhesive thread used to provide the adhesive property in the tape of the present invention must have a melting temperature lower than that of conventional synthetic fibers, as well as a good adhesive property. For example, threads which are co-polymers of nylon 6, nylon 66, and nylon 610, have good adhesion properties and melt when a temperature in the range of 120° C. to 180° C. is applied. Consequently, by merely heating one of the above threads with an iron, melting and adhering will take place.

And, in the construction of the warp knitted fabric of the present invention, the adjacent loops are directly connected to each other over one or more courses. Thus holes are produced in a net-type construction. The net construction may be an in-laid net, i.e., a marquisette net, and also a mesh or a tulle.

By using the thermo-fusible tape of the present invention, the hemming of slacks can be carried out with the use of a heated iron. Therefore, no skilled work is necessary for this operation.

In addition to this, a conventional thermo-fusible tape made of woven cloth has no elasticity, and therefore, it is necessary that the tape has a longitudinal center strip provided with only weft threads in order to prevent puckering. Because of this center strip the weft threads and warp threads of the tape are not balanced and it is difficult to handle the tape. in contrast to this, the thermo-fusible tape of a knitted fabric of the present invention has good elasticity, and the center portion of the tape is strong enough for practical use. The tape of the present invention is well balanced between the weft and warp threads and can be handled easily. Also, the tape does not curl when being used. In addition, it is not preferable that a thermo-fusible tape made from woven cloth is used on a knitted fabric, because the cloth tape causes the knitted fabric to lose its flexibility. A thermo-fusible tape made from a knitted fabric according to the present invention can be used with both woven fabrics and knitted fabrics because it gently conforms to these fabrics due to its good flexibility and proper amount of elasticity. Therefore, the thermo-fusible tape of the present invention does not have drawbacks such as those of cloth adhesive tape.

A further advantage of the thermo-fusible tape of the present invention is that, when it is cut along the widthwise direction, there are no loose threads, no loose loops, and no longitudinal splits. The thermo-fusible tape of the present invention also has a good qualitative stability.

In addition to this, the elasticity or two dimensional flexibility, and the reinforcement of tape can be achieved simultaneously by employing a special knitted construction for the thermo-fusible tape.

Namely, in the present invention, an inlay-net having a plurality of square openings is knitted from warp threads which form loops of a chain and inlay threads which are lapped over one or several wales width. The thermo-fusible tape thus produced has a good two-dimensional flexibility derived from the net construction. Furthermore, by using threads, which are lapped to form one or more loops together with loops of a chain in a wale located away from the wale at a distance of one or several wales after forming one or more loops together with said loops of another chain in another wale, and again forming one or more loops together with loops of another chain, and furthermore said threads lap at a distance of one or several wales, toward opposite directions, so that the knitted tape can be reinforced. With this construction longitudinal splits and loose loops can be effectively avoided even when the tape is cut in the widthwise direction.

BEST MODE FOR CARRYING OUT THE INVENTION

Figure 1:
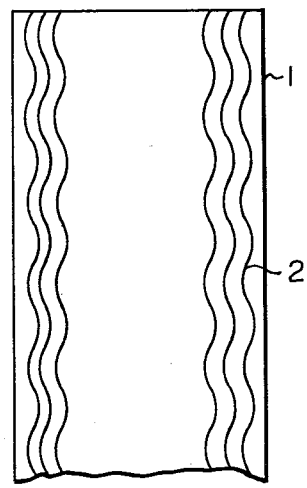
FIG. 1 is an outlined front view of one side of thermo-fusible tape of the present invention.

The details of the embodiments of the present invention as illustrated in the drawings will be described hereinafter.

In FIG. 1, which illustrates an outlined front view of one side of a thermo-fusible tape of the present invention, each of two thermal adhesive threads 2 is inserted in either side of a warp knitted tape 1 in such a way that the threads run outside are visible on one surface or both surfaces thereof.

Figure 2:
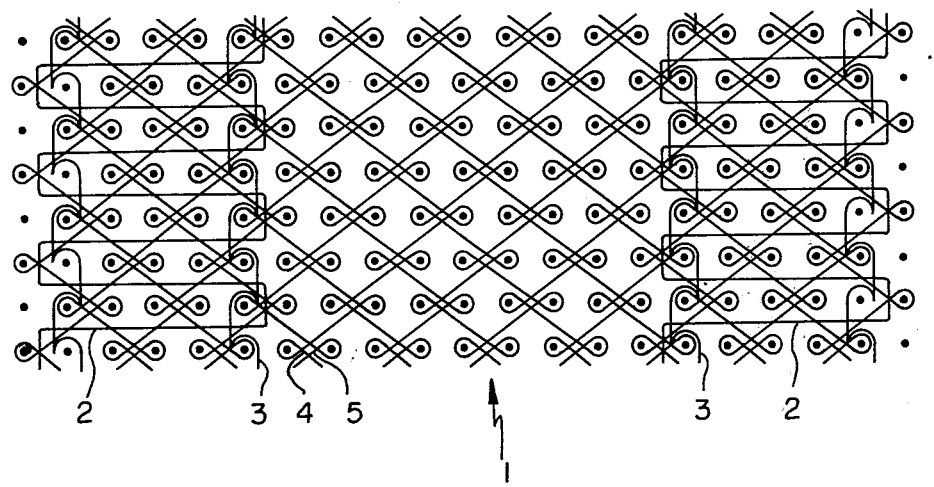
FIG. 2 is a design drawing illustrating the entire pattern of lapping motions required for producing the thermo-fusible tape of the present invention.

As illustrated in FIG. 1, one thermal adhesive thread 2 may be lapped at either the left or right of one wale, so that the thread can be inserted in a longitudinal direction. Alternatively, the thread may be laterally lapped in such a way that it is laid over several wales as illustrated in FIG. 2.

If there is any plastic projecting from the surface of the fabric being hemmed after the thermal adhesive threads have been melted, stockings worn with the slacks can be damaged. Therefore, it is preferable that the thermal adhesive thread 2 be inserted in tape 1 as illustrated in FIG. 1, so that there is no plastic projecting from the side edge of the tape.

Thermal adhesive threads 2 are threaded into a second guide bar of a warp knitting machine having two or three or more guide bars, and by means of a warp thread threaded into a first guide bar. A thermal adhesive thread 2 is attached at several alternate courses or wales, so that the thermal adhesive thread 2 extending between the adjacent attached portions floats on the surface of the warp knitted fabric.

Thus, by attaching the thermal adhesive thread at several alternate courses or wale, and traversing it to the left or right in such a way that the thread runs along the outside surface the thread is given enough slack to allow for shrinkage, so that even when a portion shrinks, the construction of the tape is not influenced at all by the shrinkage.

In addition to this, the area occupying the thermal adhesive thread on the surface of the knitted tape can be increased because the thermal adhesive thread traverses toward the left and the right thereon.

Consequently, the warp knitted tape 1 can adhere to the surface of fabric sufficiently.

Figure 3:
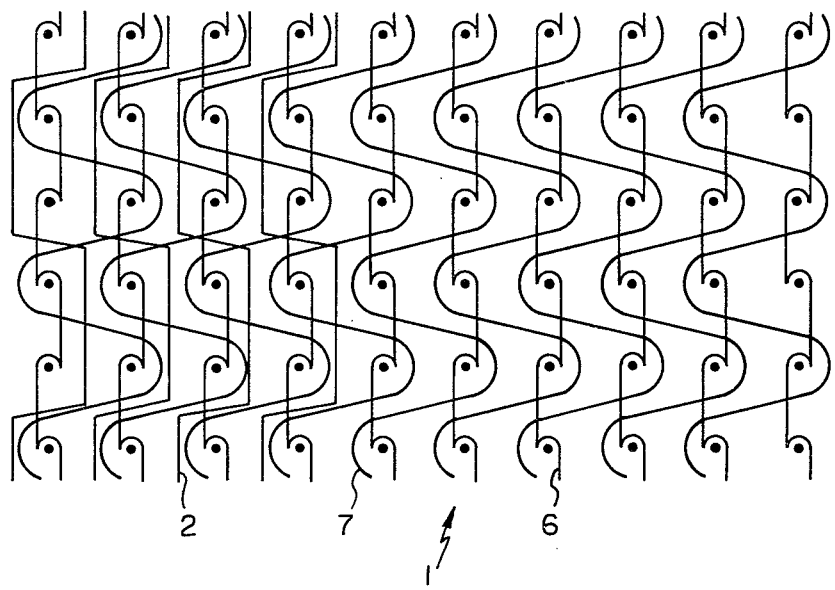
FIG. 3 is a partial design drawing illustrating one side edge of a knitted tape, which is another embodiment of the present invention.
Figure 4:
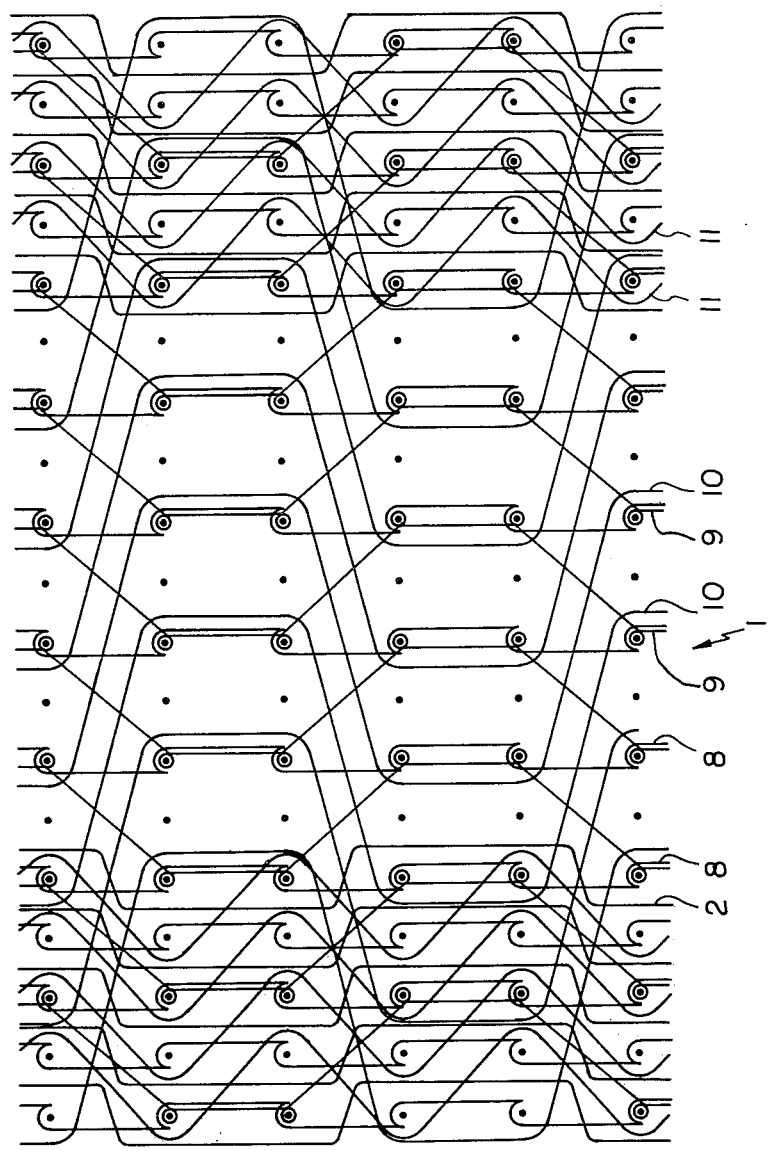
FIG. 4 is a design drawing illustrating the pattern of lapping movements necessary for producing thermo-fusible tape which is a further embodiment of the present invention.

In FIGS. 2 through 4, some partial and entire knitting constructions are illustrated.

In FIG. 2, an embodiment of the knitted construction of the present invention is illustrated entirely, and the entire width of the warp knitted tape 1 and a partial longitudinal portion thereof are illustrated. A thermal adhesive thread 2 threaded into a second guide bar is traversed laterally over several wales, but thread 2 is attached by means of another thread 3 in a first guide bar, and thread 2 extending between two adjacent attached portions runs along one surface of the knitted tape 1. Threads 4 threaded into a third guide bar, and threads 5 threaded into a fourth guide bar are half-set threaded i.e. one in and one out repeated, alternately. Every course is knitted and each of threads 4 and 5 is knitted on knitting needles which are situated at different positions, in such a way that the thread 4 threaded into the third guide bar and the thread 5 threaded into the fourth guide bar are lapped in the opposite direction to each other.

In the warp knitted tape illustrated in FIG. 2, openings are formed by a knitted loop not connected to the adjacent knitted loop, which openings give the tape proper elasticity as well as two-dimensional flexibility. When using this type of tape to hem slacks, puckering does not occur. Also, because this tape has a uniform and balanced construction, it is easily handled, and maintains its strength even though it has two-dimensional flexibility as mentioned above.

Another embodiment of the present invention is illustrated in FIG. 3. Only one side portion of a knitted tape 1 is illustrated, but the other side portion is a mirror image of the side illustrated. In FIG. 3, four thermal adhesive threads 2 in one side portion of a tape 1 threaded into a common second guide bar are two-needle underlapped toward the left or the right and then laid longitudinally with no overlapping at the left or right of the wale. Thus, a thread 2 is partially held by threads 6 threaded into the first guide bar at several alternate courses, and the portions of threads 2 extending between two held portions, float on one surface of the knitted tape 1. A thread 7 threaded into the third guide bar is lapped laterally over two wales, and connects the loops of the chain formed by thread 6, thus a square net opening is produced. Like the knitted tape illustrated in FIG. 2 the knitted tape illustrated in FIG. 3 also has a two-dimensional flexibility, does not cause puckering, and can be handled easily.

Also by providing a chain knit there is no longitudinal elongation and the dimensional stability of this tape is increased.

A further embodiment of the present invention is illustrated in FIG. 4. This tape is intended to give sufficient strength and two-dimensional flexibility to the center portion of the tape. The warp knitted tape 1 of FIG. 4 illustrates the entire lapping movements in the widthwise direction and partial lapping movements in the lengthwise directions. Two groups of thermal adhesive thread 2, each consisting of five threads threaded into a second common guide bar are one-needle underlapped toward the left or the right, and then inserted longitudinally in such a way that they are attached at every second course by means of a thread 8 threaded into the first guide bar, so that the thread extending between the two attached portions floats on one side surface of the knitted tape 1.

Within the threads 8 threaded into the first guide bar, several threads situated at the center portion of the tape are threaded in a sequence of one-in, one-out repeated, and also threads 9 are threaded into the third guide bar in a sequence of one-in, one-out repeated. Within one wale, two courses are knitted by thread 9 together with the knitted loops of thread 8, and then thread 9 is two-needle underlapped. Within the wale, two courses are knitted by thread 9 together with the knitted loop of thread 8. Thereafter thread 9 returns to the original wale. The lapping movements in the pattern of 2-3/1-0/1-0/2-3 are repeated.

Furthermore, threads 10 threaded into a fourth guide bar are laid-in in such a manner that a thread 10 extends laterally within five wales and longitudinally within two courses and repeated, while threads 11 threaded into the fifth guide bar are laid-in at the sides of the tape where thermal adhesive threads 2 are to be inserted, in such a manner that thread 11 extends laterally within two wales and longitudinally within one course. At the center of the knitted tape 1 as illustrated in FIG. 4, a plurality of square opening are formed by means of chain loops of thread 8 and the inlay-threads 10 lapped laterally. Thus a marquisette net construction is formed, and said center portion has two-dimensional flexibility. Furthermore, because the threads 9 form loops together with the chain loops of the threads 8, so that the adjacent two wales are connected to each other, the strength of the tape is increased. Also, when the tape is cut along the widthwise direction for use in hemming, there are no loose loops or longitudinal splits at the center of the tape, nor loose threads along the cut edge of the tape.

FIGS. 5 through 9 illustrate the lapping movements of threads 12, 2, 13, 14 and 15 respectively over the entire width of the tape. These lapping movements prevent loose loops from occurring along the cut edge of the tape and longtudinal splits from occurring at the center and increase the strength of the knitted tape. In the illustrations the symbol "O" indicates that a thread is threaded into a guide of a bar and the symbol "X" indicates that a guide of a bar is not threaded. The lapping movements illustrated in FIGS. 5 through 9, illustrate a warp knitted tape being knitted by using nineteen knitting needles.

Figure 5:
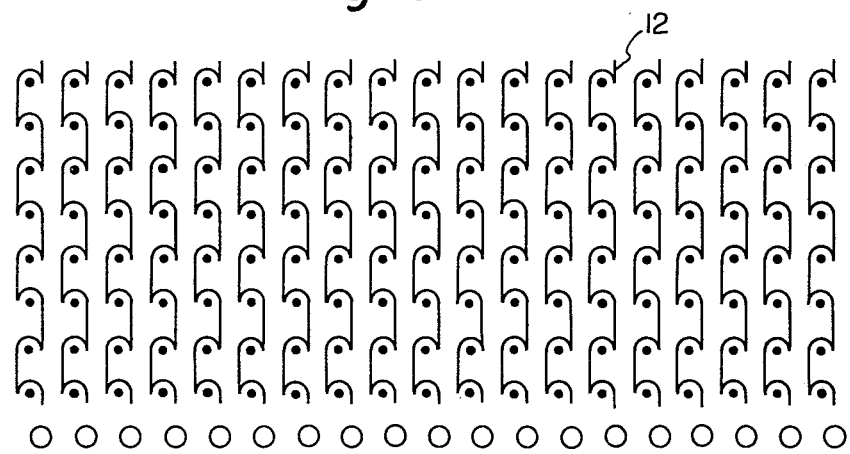
FIGS. 5 through 9, are design drawings illustrating the pattern of lapping movements, which correspond to the design of another embodiment of the present invention, and which correspond to each movement of the guide bars.

FIG. 5 illustrates a way to form loops on all of the knitting needles by lapping threads 12 threaded into a first guide bar by lapping movements in the pattern of 0-1/1-0.

Figure 6:
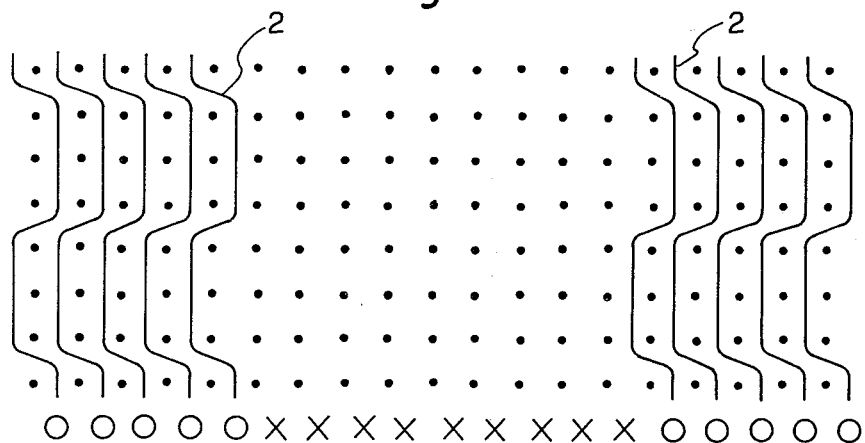

In FIG. 6, the lapping movement of the thermal adhesive threads 2 threaded into a second guide bar is illustrated. In this case, five threads are threaded into the second guide bar at each edge of the tape and thread 2 is attached at every third course by means of the chain loop thread 12 as illustrated in FIG. 5 which is threaded into the first guide bar in a lapping pattern of 0-0/1-1/1-1/1-1/0-0/0-0. In this case, the portions of thread 2, which are attached by thread 12 threaded into the first guide bar, and which extend between two held portions, float on one surface of the knitted tape.

Figure 7:
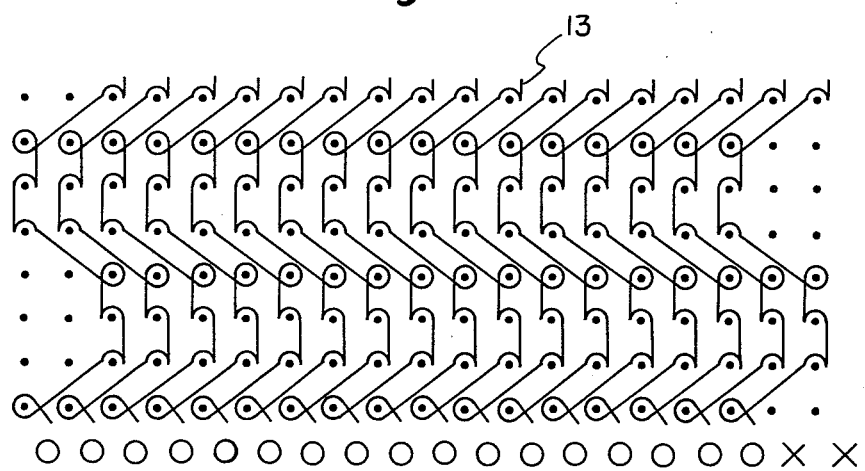

In FIG. 7, threads 13 are threaded into all of the guides of a third guide bar with the exception of the two guides situated at one end of the tape. Threads 1B are knitted in the lapping pattern of 2-3/1-0/0-1/1-0/2-3/3-2. Thread 13 is two-needle underlapped at every third course after being looped together with the thread 12 which is threaded into the first guide bar, so that it is interconnected to the chain loop in the wale. Because of thread 13, the formed tape has increased strength as does the tape of FIG. 4, and when the tape is cut along the widthwise direction for use in hemming, there are no loose loops or longitudinal splits at the center of the tape, nor loose threads along the cut edge of the tape.

Figure 8:
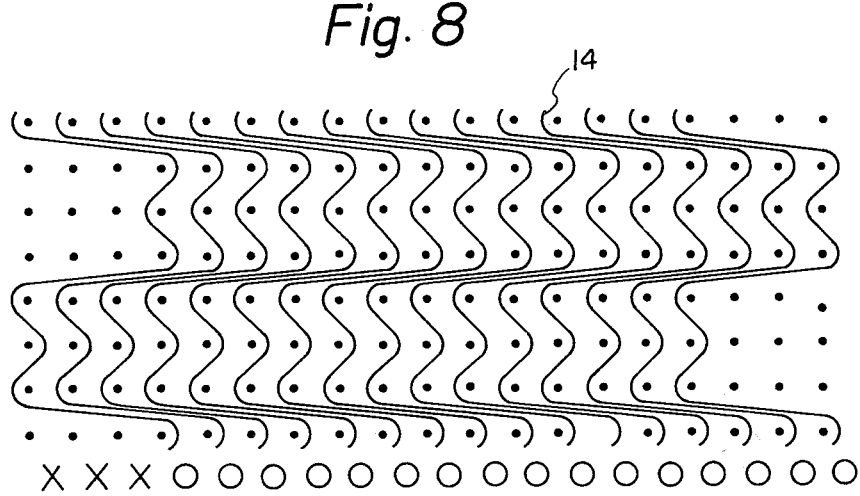

In FIG. 8, the threads 14 are threaded into all the guides of a fourth guide bar with the exception of the three guides at one end of the tape. The threads 14 are laid-in in a lapping pattern of 0-0/4-4/3-3/4-4/0-0/1-1 without forming any loops. A square net opening is formed by thread 14 and the chain loops of the thread 12 threaded into the first guide bar as well as the chain loops of the thread 13 threaded into the third guide bar. The thus formed tape has good two-dimendional flexibility, and the constructional density of the wale and course directions is well balanced with each other, and this means that the tape is well reinforced.

Figure 9:
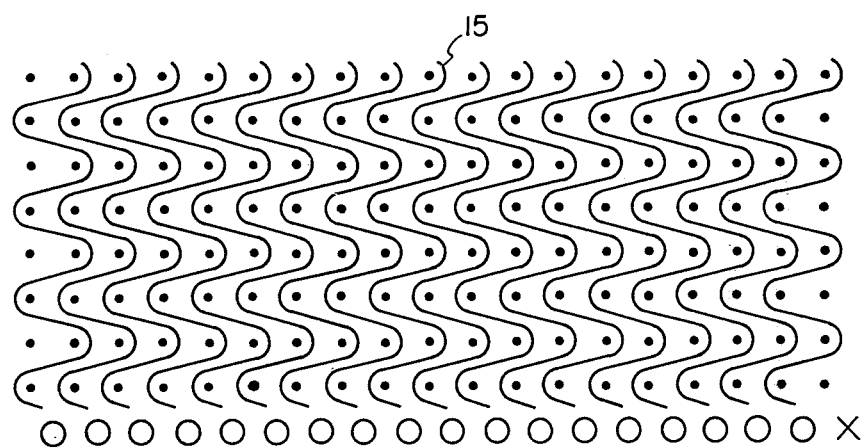

In FIG. 9, the threads 15 are threaded into all of the guides of a fifth guide bar with the exception of one guide situated at one end of the tape. Threads 15 are knitted in a lapping pattern of 2-2/0-0, so that the threads 15 are laid into the tape by lapping without forming any loops. Thread 15 reinforces the tape and helps to balance the threads in the wale and course directions.

From the knitted tape with the threads having lapping movements as illustrated in FIGS. 5 through 9, a marquisette net (i.e. square net opening) can be knitted on the tape by means of the threads 13 threaded into a third guide bar, the thread 14 threaded into a fourth guide bar and the thread 15 threaded into a fifth guide bar, and at the same time, threads 13, 14 and 15 can act to reinforce and balance the tape. Also, there are no loose loops along the edge of the tape or no longitudinal splits of the tape, and the thermo-fusible tape can be handled easily when used for hemming.

In the thermo-fusible tape of the present invention, threads suitable for use other than the thermal adhesive thread, can be threads of a thermoplastic synthetic filament such as a polyester or polyamide. These threads give strength to the tape. But threads of a thermoplastic synthetic filament having a property of about 10 percent shrinkage under boiling water (under the method of JIS L 1090;5 10A), are not suitable because this filament will cause the tape to shrink when it is heated in the course of adhering.

Therefore, when the thermoplastic filament yarn is used, it is necessary to apply some treatment which includes a heat treatment so that the shrinkage under boiled water is reduced to less than 3 percent. The treatment can be a well known heat treatment which is usually carried out after texturing a thread by a false twisting method, or a method of cheese dyeing, wherein the cheese is wound from the thread under a relaxed condition after texturizing.

In the present invention, 75 denier 36 filament polyester synthetic filaments are textured by a false twisting method, and then the filaments are dyed in the condition of cheese. This filament shows a shrinkage of less than 1 percent when boiled in water. The warp knitted tape shows stable and flexible properties. Furthermore, 50 denier multifilament or 30 denier multifilament may also be used to provide more flexibility.

We claim:

1. In a thermo-fusible tape of a warp knitted fabric, the entire tape having proper elasticity and flexibility and a balanced and flat construction over the whole width of the tape, the improvement which comprises in that at least one thermal adhesive thread extends longitudinally within a width of several wales of the warp knitted fabric in each edge portion of said tape, said thermal adhesive thread being partially held by at least one of the threads forming the ground of said knitted fabric, and portions of said thermal adhesive thread, which extend between two held portions, float on one or both surfaces of said warp knitted fabric.

2. A thermo-fusible tape according to claim 1 wherein the warp knitted fabric has a net construction.

3. A thermo-fusible tape according to claims 1 or 2 wherein thermal adhesive threads are laid-in substantially straight in a longitudinal direction of the tape.

4. A thermo-fusible tape according to claims 1 or 2 wherein at least one thermal adhesive thread is laid into the warp knitted fabric over at least two wales.

5. A thermo-fusible tape according to claims 1 or 2 wherein the warp knitted fabric of said tape is a three- or more-bar fabric knitted by a warp knitting machine provided with three or more guide bars, at least one thermal adhesive thread being a thread laid-in by a second guide bar and partially attached by loops formed by the threads of a first guide bar, and a thermal adhesive thread part floating between said loops.

6. A thermo-fusible tape according to claims 1 or 2, wherein threads other than the thermal adhesive threads are threads of a thermoplastic synthetic fiber, of which shrinkage caused by boiling water is equal to or less than three percent.

7. A thermo-fusible tape according to claim 2 wherein loops in adjacent wales are not connected together over one or more courses, so that openings in said net construction are formed.

8. A thermo-fusible tape according to claim 2 wherein said net construction is an inlay net or a marquisette net composed of knitted chains of loops and inlay threads.

9. In a thermo-fusible tape of a warp knitted fabric the improvement wherein said warp knitted fabric comprises threads forming chains of loops, inlay threads extending within a width of one or several wales, and threads each of which forms one or more loops with said loops of a chain in a wale successively form one or more loops with loops of another chain in another wale located away from said wale at a distance of at least one wale and again form loops in the first wale in the same way, said loop formations being repeated, and said warp knitted fabric further comprises at least one thermal adhesive thread which extends longitudinally within a width of several wales of said warp knitted fabric in each edge portion of said tape, said thermal adhesive thread being positioned on at least one surface of said fabric.

10. A thermo-fusible tape according to claim 9 wherein thermal adhesive threads are laid-in substantially straight in a longitudinal direction of said tape.

11. A thermo-fusible according to claim 9 wherein at least one thermal adhesive thread is laid into said warp knitted fabric over at least two wales.

12. A thermo-fusible tape according to claim 9 wherein said warp knitted fabric of said tape is a four- or more-bar fabric knitted by a warp knitting machine provided with four or more guide bars, at least one thermal adhesive thread being a thread laid-in by a second guide bar and partially attached by loops formed by threads of a first guide bar, and a thermal adhesive thread part floating between said loops.

13. A thermo-fusible tape according to claim 9 wherein threads used other than the thermal adhesive threads are threads of a thermoplastic synthetic fiber, of which the shrinkage caused by boiling water is equal to or less than three percent.

* * * * *

UNITED STATES PATENT AND TRADEMARK OFFICE
CERTIFICATE OF CORRECTION

PATENT NO. : 4,320,634
DATED : March 23, 1982
INVENTOR(S) : Koichi Hashimoto et al.

It is certified that error appears in the above—identified patent and that said Letters Patent is hereby corrected as shown below:

On the title page, item [73] Assignee: should read
-- Toray Textiles, Inc., and Nitto Electric Industrial Co., Ltd., Tokyo, Japan and Osaka, Japan --.

Signed and Sealed this

Nineteenth Day of October 1982

[SEAL]

Attest:

GERALD J. MOSSINGHOFF

Attesting Officer

Commissioner of Patents and Trademarks